US010397216B2

(12) United States Patent
Agrawal et al.

(10) Patent No.: US 10,397,216 B2
(45) Date of Patent: *Aug. 27, 2019

(54) SYSTEMS AND METHODS FOR PERFORMING SECURE BACKUP OPERATIONS

(71) Applicant: Veritas Technologies LLC, Mountain View, CA (US)

(72) Inventors: Mukund Agrawal, Pune (IN); Gaurav Malhotra, Pune (IN); Vikas Kumar, Uttarakhand (IN); Nachiket Tanksale, Satara (IN)

(73) Assignee: Veritas Technologies LLC, Santa Clara, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/356,489

(22) Filed: Nov. 18, 2016

(65) Prior Publication Data

US 2018/0145970 A1 May 24, 2018

(51) Int. Cl.
*H04L 29/06* (2006.01)
*G06F 11/14* (2006.01)
*H04L 9/14* (2006.01)
*H04L 9/30* (2006.01)
*H04L 9/32* (2006.01)
*H04L 9/08* (2006.01)

(52) U.S. Cl.
CPC ...... *H04L 63/0823* (2013.01); *G06F 11/1464* (2013.01); *H04L 9/088* (2013.01); *H04L 9/3263* (2013.01); *H04L 63/105* (2013.01)

(58) Field of Classification Search
CPC ..... H04L 63/0823; H04L 9/30; H04L 9/3263; H04L 9/14; G06F 11/1464; G06F 2201/80
See application file for complete search history.

(56) References Cited

U.S. PATENT DOCUMENTS 9,396,209 B2 * 7/2016 Fukui ................ G06F 17/30377
9,516,107 B2 * 12/2016 Kaplan ............... H04L 67/1095
RE46,439 E * 6/2017 Schneider ........... H04L 63/0218
(Continued)

OTHER PUBLICATIONS

Public-key cryptography; Wikipedia; accessed on Sep. 25, 2016; as published on the internet at https://en.wikipedia.org/wiki/Public-key_cryptography; Jan. 4, 2004.
(Continued)

*Primary Examiner* — Mohammad A Siddiqi
(74) *Attorney, Agent, or Firm* — FisherBroyles, LLP

(57) ABSTRACT

The disclosed computer-implemented method for performing secure backup operations may include (i) identifying a backup server that has been designated to perform a backup task for a backup client, (ii) prior to facilitating the backup task on the backup client (a) identifying both a trust level of the designated backup server and a sensitivity level of the backup task and (b) determining whether the trust level of the designated backup server is appropriate for the sensitivity level of the backup task, and (iii) facilitating the backup task on the backup client based on the determination of whether the trust level of the designated backup server is appropriate for the sensitivity level of the backup task. Various other methods, systems, and computer-readable media are also disclosed.

15 Claims, 4 Drawing Sheets

(56) References Cited

U.S. PATENT DOCUMENTS

| | | | |
|---|---|---|---|
| 9,892,268 B2* | 2/2018 | Nguyen | G06F 21/604 |
| 2006/0048228 A1 | 3/2006 | Takemori | |
| 2007/0220319 A1 | 9/2007 | Desai | |
| 2009/0316907 A1* | 12/2009 | Cachin | H04L 9/083 380/278 |
| 2012/0078851 A1* | 3/2012 | Pinault | G06F 11/1448 707/652 |
| 2012/0284780 A1* | 11/2012 | Bergeson | H04L 63/0823 726/6 |
| 2013/0061035 A1* | 3/2013 | Hook | H04L 9/088 713/150 |
| 2014/0006350 A1 | 1/2014 | Fukui | |
| 2014/0137222 A1 | 5/2014 | Nguyen | |
| 2016/0125199 A1* | 5/2016 | Lee | G06F 21/316 726/28 |
| 2016/0335628 A1 | 11/2016 | Weigold | |
| 2017/0180394 A1 | 6/2017 | Crofton | |
| 2018/0145969 A1* | 5/2018 | Agrawal | H04L 63/0823 |

OTHER PUBLICATIONS

Public-key cryptography: Associating public keys with identities; Wikipedia; accessed on Sep. 25, 2016; as published on the internet at https://en.wikipedia.org/wiki/Public-key_cryptography; Jan. 4, 2004.

Public key certificate; Wikipedia; accessed on Sep. 25, 2016; as published on the internet at https://en.wikipedia.org/wiki/Public_key_certificate; Feb. 28, 2004.

Public key infrastructure; Wikipedia; accessed on Sep. 25, 2016; as published on the internet at https://en.wikipedia.org/wiki/Public_key_infrastructure; Jan. 4, 2004.

Certificate authority; Wikipedia; accessed on Sep. 25, 2016; as published on the internet at https://en.wikipedia.org/wiki/Certificate_authority; Apr. 2, 2004.

Truststore and Keystore Definitions; StackOverflow; accessed on Sep. 25, 2016; as published on the internet at http://stackoverflow.com/questions/318441/truststore-and-keystore-definitions; Dec. 5, 2008.

Is a self-signed SSL certificate much better than nothing?; StackExchange; accessed on Sep. 25, 2016; as published on the internet at http://security.stackexchange.com/questions/38727/is-a-self-signed-ssl-certificate-much-better-than-nothing; Sep. 25, 2013.

Building an Enterprise Root Certification Authority in Small and Medium Businesses; Microsoft; accessed on Sep. 25, 2016; as published on the internet at https://msdn.microsoft.com/en-us/library/cc875810.aspx; Jan. 15, 2015.

Active Directory Certificate Services; Microsoft; accessed on Sep. 25, 2016; as published on the internet at https://technet.microsoft.com/en-us/library/cc770357%28v=ws.10%29.aspx; Feb. 27, 2011.

How to Use X.509 Certificates and SSL For Secure Communications; Stephen McHenry; accessed on Sep. 25, 2016; as published on the internet at https://sites.google.com/site/x509certificateusage/; Sep. 15, 2013.

Dynamic Host Configuration Protocol; Wikipedia; accessed on Oct. 10, 2016; as published on the internet at https://en.wikipedia.org/wiki/Dynamic_Host_Configuration_Protocol; Jul. 6, 2004.

CommVault; products and technology provided by CommVault found at www.commvault.com; Dec. 2, 1998.

Mukund Agrawal et al.; Systems and Methods for Performing Secure Backup Operations; U.S. Appl. No. 15/356,476; Filed Nov. 18, 2016.

* cited by examiner

SYSTEMS AND METHODS FOR PERFORMING SECURE BACKUP OPERATIONS

CROSS REFERENCE TO RELATED APPLICATION

This application incorporates by reference the entirety of U.S. application Ser. No. 15/356,476 by Mukund Agrawal, Gaurav Malhotra, Vikas Kumar, and Nachiket Tanksale, titled Systems and Methods for Performing Secure Backup Operations, filed on 18 Nov. 2016.

BACKGROUND

Individuals and organizations that subscribe to backup services may wish to ensure that backup servers storing and restoring their data are able to adequately protect sensitive data from attackers. Likewise, backup services may wish to ensure that sensitive backup data is not restored to unverified clients. As such, large cloud-based or distributed backup services may configure backup servers (e.g., media servers) and client devices to establish secure, verified communication channels before data transfer begins. In particular, a backup service may facilitate secure data transfer by deploying certificates signed by trusted certificate authorities on the service's backup servers and/or on client devices that subscribe to the service.

Unfortunately, traditional systems for deploying signed certificates on backup servers and client devices may be slow and/or ineffective. For example, because backup servers and client devices may have varying computing environments, backup services may be unable to deploy certificates via a standard process or infrastructure. As such, deploying a signed certificate may require manual input or confirmation from one or more administrators within a backup service. Administrators managing vast numbers of backup servers or client devices may be unable to deploy certificates quickly enough to meet the demands of backup clients. As such, backup services may be unable to complete requested backup operations, or may be unable to provide backup clients with sufficient security during backup operations. The instant disclosure, therefore, identifies and addresses a need for systems and methods for performing secure backup operations.

SUMMARY

As will be described in greater detail below, the instant disclosure describes various systems and methods for performing secure backup operations. In one example, a method for performing such a task may include (i) identifying a backup server that has been designated to perform a backup task for a backup client, (ii) prior to facilitating the backup task on the backup client (a) identifying both a trust level of the designated backup server and a sensitivity level of the backup task and (b) determining whether the trust level of the designated backup server is appropriate for the sensitivity level of the backup task, and (iii) facilitating the backup task on the backup client based on the determination of whether the trust level of the designated backup server is appropriate for the sensitivity level of the backup task.

In some examples, identifying the trust level of the designated backup server may include identifying a security level with which the backup server is able to perform backup operations based on a signed certificate deployed on the backup server. In these examples, the signed certificate may be deployed on the backup server based on at least one security characteristic of the backup server.

In some embodiments, identifying the sensitivity level of the backup task may include identifying a type of backup operation involved in the backup task and/or a type of backup data involved in the backup task. Additionally or alternatively, identifying the sensitivity level of the backup task may include identifying a security characteristic of the backup client.

In some examples, the method may include determining that the trust level of the designated backup server is appropriate for the sensitivity level of the backup task. In these examples, facilitating the backup task on the backup client may include transferring backup data involved in the backup task to the backup server. In one embodiment, the backup data transferred to the backup server may be unencrypted.

In other examples, the method may include determining that the trust level of the designated backup server is not appropriate for the sensitivity level of the backup task. In these examples, facilitating the backup task on the backup client may include reducing the sensitivity level of the backup task prior to facilitating the backup task on the backup client. In one embodiment, reducing the sensitivity level of the backup task may include encrypting backup data involved in the backup task.

In some embodiments, the method may further include determining a trust level of the backup client by identifying at least one security characteristic of the backup client. The method may then include deploying a signed certificate on the backup client that enables the backup client to facilitate backup operations with a security level that corresponds to the trust level of the backup client. In addition, the method may include facilitating the backup task on the backup client based on a determination of whether the security level of the signed certificate is appropriate for the sensitivity level of the backup task.

In one embodiment, a system for performing secure backup operations above-described method may include several modules stored in memory, including (i) an identification module that identifies a backup server that has been designated to perform a backup task for a backup client, (ii) a determination module, that, prior the backup task being facilitated on the backup client (a) identifies both a trust level of the designated backup server and a sensitivity level of the backup task and (b) determines whether the trust level of the designated backup server is appropriate for the sensitivity level of the backup task, and (iii) a backup module that facilitates the backup task on the backup client based on the determination of whether the trust level of the designated backup server is appropriate for the sensitivity level of the backup task. In addition, the system may include at least one physical processor configured to execute the identification module, the determination module, and the backup module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a backup server that has been designated to perform a backup task for a backup client, (ii) prior to facilitating the backup task on the backup client (a) identify both a trust level of the designated backup server and a sensitivity level of the backup task and (b) determine whether the trust level of the designated backup server is appropriate for the sensitivity level of the backup task, and (iii) facilitate the backup task on the backup client based on the determination of whether the trust level of the designated backup server is appropriate for the sensitivity level of the backup task Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
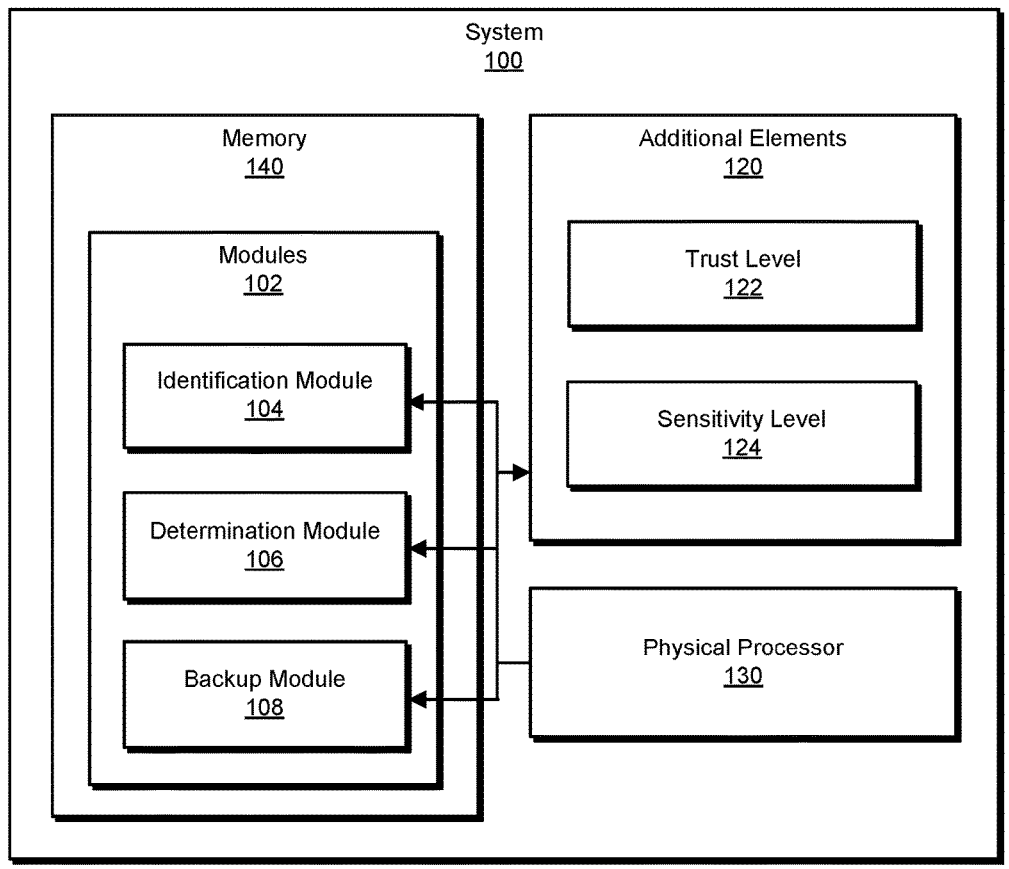
FIG. 1 is a block diagram of an example system for performing secure backup operations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing secure backup operations. As will be explained in greater detail below, by enabling a backup client to verify the trustworthiness or security level of a backup server that is to perform a backup operation for the backup client, the disclosed systems and methods may ensure that sensitive backup data is handled only by backup servers capable of securely protecting and storing the data. Moreover, the systems and methods described herein may improve the functioning and/or performance of a backup client by efficiently completing backup operations with various sensitivity levels, while preventing sensitive backup data from being leaked or accessed by unauthorized entities. These systems and methods may also improve the field of data backup and restoration by reducing the need for administrators to manually deploy certificates signed by certificate authorities on backup servers and client devices.

Figure 2:
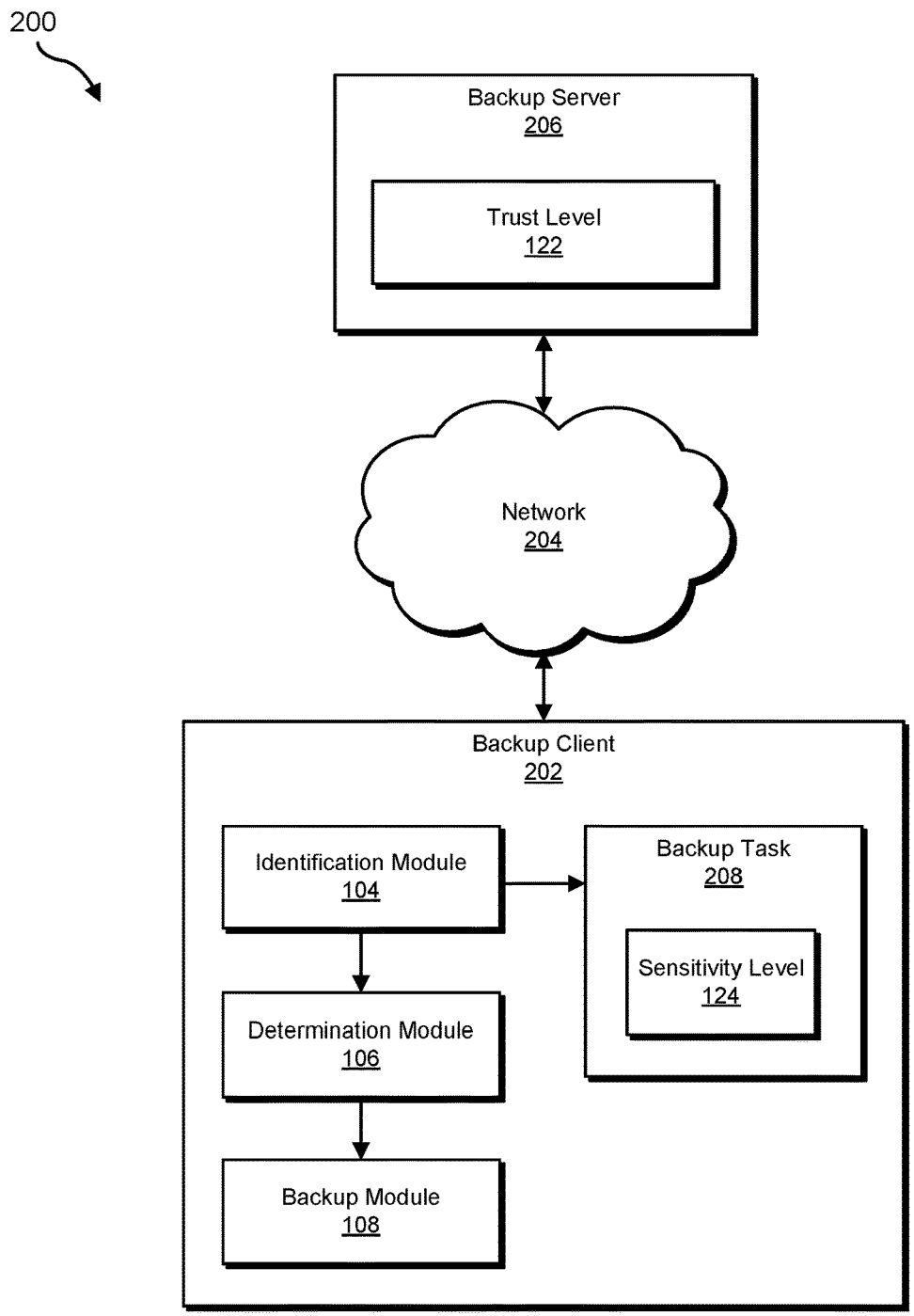
FIG. 2 is a block diagram of an additional example system for performing secure backup operations.

The following will provide, with reference to FIGS. 1 and 2, detailed descriptions of example systems for performing secure backup operations. Detailed descriptions of corresponding computer-implemented methods will also be provided in connection with FIGS. 3 and 4.

FIG. 1 is a block diagram of an example system 100 for performing secure backup operations. As illustrated in this figure, example system 100 may include one or more modules 102 for performing one or more tasks. As will be explained in greater detail below, example system 100 may include an identification module 104 that identifies a backup server that has been designated to perform a backup task for a backup client. In addition, example system 100 may include a determination module 106 that, prior to the backup task being facilitated on the backup client (i) identifies both a trust level of the designated backup server and a sensitivity level of the backup and (ii) determines whether the trust level of the designated backup server is appropriate for the sensitivity level of the backup task. Finally, example system 100 may include a backup module 108 that facilitates the backup task on the backup client based on the determination of whether the trust level of the designated backup server is appropriate for the sensitivity level of the backup task. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., backup client 202 and/or backup server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing secure backup operations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120. In one example, additional elements 120 may include a trust level 122, which generally represents any quantification or assessment of the trustworthiness, hygiene, or security state of a backup server. As shown in FIG. 1, additional elements 120 may also include a sensitivity level 124, which generally represents any quantification or assessment of the importance and/or desired confidentiality of a backup task or data involved in a backup task.

Example system 100 in FIG. 1 may be implemented in a variety of ways. For example, all or a portion of example system 100 may represent portions of example system 200 in FIG. 2. As shown in FIG. 2, system 200 may include a backup client 202 in communication with a backup server 206 via a network 204. In one example, all or a portion of the functionality of modules 102 may be performed by backup client 202, backup server 206, and/or any other suitable computing system. As will be described in greater detail below, one or more of modules 102 from FIG. 1 may, when executed by at least one processor of backup client 202 and/or backup server 206, enable backup client 202 and/or backup server 206 to perform secure backup operations.

For example, identification module 104 may cause backup client 202 to identify backup server 206 that has been designated to perform a backup task 208 for backup client 202. Determination module 106 may then cause backup client 202 to (i) identify both trust level 122 of backup server 206 and sensitivity level 124 of backup task 208 and (ii) determine whether trust level 122 is appropriate for sensitivity level 124. Finally, backup module 108 may cause backup client 202 to facilitate backup task 208 based on the determination of whether trust level 122 is appropriate for sensitivity level 124.

Backup client 202 generally represents any type or form of computing device capable of reading computer-executable instructions. In some examples, backup client 202 may represent a computing device managed by an individual or organization that employs a backup service to perform backup operations. In these examples, backup client 202 may run backup software provided or configured by the backup service. Additional examples of backup client 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Backup server 206 generally represents any type or form of computing device that is capable of receiving, storing, managing, and/or transferring backup data or metadata describing backup data. In some examples, backup server 206 may represent a media server that runs server-side backup software provided or configured by a backup service. Additional examples of backup server 206 include, without limitation, storage servers, database servers, application servers, and/or web servers configured to run certain software applications and/or provide various storage, database, and/or web services. Although illustrated as a single entity in FIG. 2, backup server 206 may include and/or represent a plurality of servers that work and/or operate in conjunction with one another.

Network 204 generally represents any medium or architecture capable of facilitating communication or data transfer. In one example, network 204 may facilitate communication between backup client 202 and backup server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
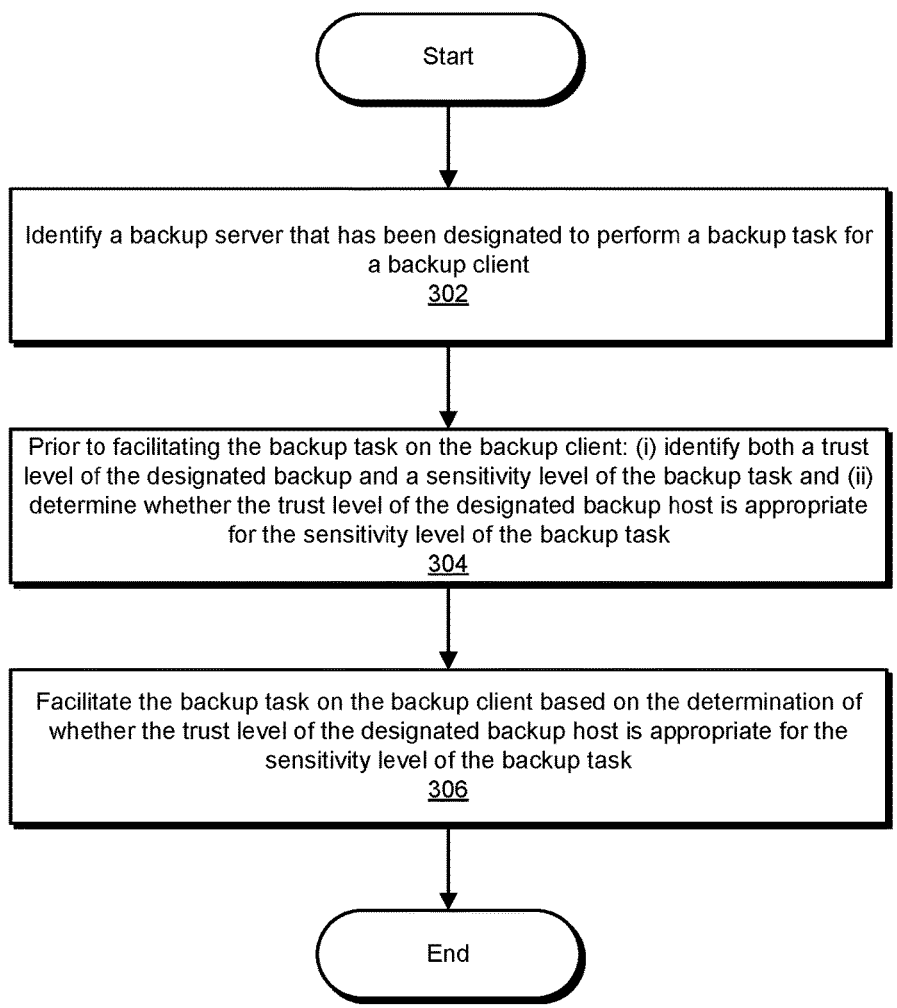
FIG. 3 is a flow diagram of an example method for performing secure backup operations.

FIG. 3 is a flow diagram of an example computer-implemented method 300 for performing secure backup operations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a backup server that has been designated to perform a backup task for a backup client. For example, identification module 104 may, as part of backup client 202 in FIG. 2, identify backup server 206 that has been designated to perform backup task 208 for backup client 202.

The term "backup task," as used herein, generally refers to any type or form of project, job, or operation involving receiving, transmitting, storing, handling, and/or restoring backup data (or metadata describing backup data). In some examples, a backup task may involve data transfer between a backup client and a backup server. In other examples, a backup task may involve backup data or metadata manipulation on backup servers (e.g., identifying backup images, deleting backup data, and updating backup policies or software).

The systems described herein may identify a backup server that has been designated to perform a backup task for a backup client in a variety of ways. In some examples, identification module 104 may, while running on a backup client, identify one or more backup servers managed by a backup service that have been allocated or assigned to the backup client by the backup service.

In some embodiments, identification module 104 may establish a secure connection between a backup client and a designated backup server. For example, after a backup client (or a user of a backup client) has requested or initiated a backup task to be performed, identification module 104 may contact a backup server responsible for performing the backup task. Alternatively, identification module 104 may determine that a backup server has initiated establishing a secure connection with the backup client. In some examples, establishing a secure connection between a backup client and a backup server may involve both devices identifying and authenticating each other. In particular, a backup client and a backup server may authenticate each other based on information within signed certificates deployed on one or both devices.

The term "signed certificate," as used herein, generally refers to any type or form of electronic credential used to assert the identity of a user or device. In some examples, a signed certificate may assert the identity of a device by encrypting a signature associated with the device with a private encryption key (e.g., an encryption key known only to the device or a trusted third party). Another device that wishes to verify the identity of the device providing the certificate may decrypt the signature using a public encryption key that corresponds to the private encryption key. After the verification is complete, a secure, encrypted communication channel may be established between the two devices. As will be explained in greater detail below, the systems described herein may deploy signed certificates on backup clients and backup servers to enable the devices to both communicate securely and determine each other's trust and/or security levels.

Returning to FIG. 3, at step 304 one or more of the systems described herein may, prior to facilitating the backup task on the backup client (i) identify both a trust level of the designated backup server and a sensitivity level of the backup task and (ii) determine whether the trust level of the designated backup server is appropriate for the sensitivity level of the backup task. For example, determination module 106 may, as part of backup client 202 in FIG. 2, prior to backup task 208 being facilitated on backup client 202 (i) identify both trust level 122 and sensitivity level 124 and (ii) determine whether trust level 122 is appropriate for sensitivity level 124.

The term "trust level," as used herein, generally refers to any quantification or assessment of the trustworthiness, hygiene, or security state of a computing device. In some examples, a trust level may represent an overall measure of the security characteristics of a computing device. In addition, a trust level may be represented as a number within any type or form of range or scale.

The systems described herein may identify a trust level of a designated backup server in a variety of ways. In some examples, determination module 106 may determine the trust level of a designated backup server by identifying one or more security characteristics of the backup server. The term "security characteristic," as used herein, generally refers to any type of property or feature indicative of a computing device's ability to safely receive, store, handle, and/or transfer backup data (i.e., without the data being lost, corrupted, or accessed by an unauthorized entity). Examples of security characteristics of a backup server include, without limitation, characteristics of a network used by the backup server to transfer backup data (e.g., settings of a Domain Name Server (DNS) and/or Dynamic Server Configuration Protocol (DHCP) used by the backup server), characteristics of a data storage system of the backup server, settings of the security infrastructure of the backup server, and/or privileges granted to a user or administrator of the backup server.

In other examples, determination module 106 may determine a trust level of a designated backup server by identifying a signed certificate that has been deployed on the backup server based on the backup server's security characteristics. For example, the disclosed systems may deploy signed certificates on backup hosts (i.e., backup clients and backup servers) that enable the backup hosts to transfer and handle backup data with a security level appropriate for the trust level of the backup hosts. In particular, the disclosed systems may deploy signed certificates on backup hosts in accordance with the deployment processes described in application Ser. No. 15/356,476. As such, determination module 106 may determine that a backup server with a highly secure signed certificate (e.g., a certificate signed by a certificate authority and deployed manually by an administrator) has a high trust level, while a backup server with an insecure signed certificate (e.g., a self-signed certificate) has a low trust level.

In some embodiments, determination module 106 may identify a trust level of a backup server based on security information included within the backup server's signed certificate. For example, determination module 106 may determine that a backup service that implements the disclosed systems has stored, within a designated or specially-configured field of the backup server's signed certificate, information that directly indicates the trust level of the backup server and/or security characteristics of the backup server. In some examples, determination module 106 may identify such information while identification module 104 identifies or connects to a designated backup server (as explained in connection with step 302).

At any point before or after determination module 106 identifies a trust level of a designated backup server, determination module 106 may also identify a sensitivity level of a backup task to be performed by the designated backup server. The term "sensitivity level," as used herein, generally refers to any indication or quantification of the importance and/or desired confidentiality of a backup task or backup data involved in the backup task.

Determination module 106 may identify a sensitivity level of a backup task in a variety of ways. In some examples, determination module 106 may determine a sensitivity level of a backup task based on a type of data involved in the backup task. For example, determination module 106 may determine that a backup task involving data that a backup client has identified as classified or critical is more sensitive than a backup task involving unclassified or non-critical data. In another example, determination module 106 may determine that a backup task involving unencrypted data is more sensitive than a backup task involving encrypted data, as unencrypted data may represent a greater security risk to a backup client if accessed by unauthorized parties. Additionally or alternatively, determination module 106 may determine a sensitivity level of a backup task based on a type of backup operation involved in the backup task. For example, determination module 106 may determine that backup tasks involving restoring data to a backup client are more sensitive than backup tasks that involve only transferring backup data to a backup server.

After identifying a trust level of a designated backup server and a sensitivity level of a backup task to be performed by the backup server, determination module 106 may determine whether the trust level is appropriate for the sensitivity level. In general, determination module 106 may determine that highly sensitive backup tasks should only be performed by backup servers with the highest trust levels, while backup tasks with low sensitivity levels may be performed by backup servers with low trust levels. In some examples, determination module 106 may determine whether a trust level of a backup server is appropriate for a sensitivity level of a backup task based on whether the backup task has been designated (e.g., by a backup client, backup service, or administrator) as an acceptable type of backup task to be performed by backup servers with the identified trust level. Additionally or alternatively, determination module 106 may determine that a trust level of a backup server is appropriate for a sensitivity level of a backup task in the event that the trust level is at least as high as the sensitivity level (e.g., in the event that both the sensitivity level and trust level are represented as numerical values within a similar scale).

Returning to FIG. 3, at step 306 one or more of the systems described herein may facilitate the backup task on the backup client based on the determination of whether the trust level of the designated backup server is appropriate for the sensitivity level of the backup task. For example, backup module 108 may, as part of backup client 202 in FIG. 2, facilitate backup task 208 based on the determination of whether trust level 122 is appropriate for sensitivity level 124.

The systems described herein may facilitate a backup task on a backup client in a variety of ways. In the event that determination module 106 determines that a designated backup server has a trust level appropriate for a sensitivity level of a backup task (e.g., the backup server has a signed certificate with an appropriate security level), backup module 108 may enable or permit the backup task to be completed. For example, backup module 108 may initiate data transfer to or from the designated backup server.

However, in the event that determination module 106 determines that a designated backup server does not have a trust level appropriate for a sensitivity level of a backup task, backup module 108 may not permit backup data involved in the backup task to be transferred or manipulated. In one embodiment, backup module 108 may abort or cancel the backup task. In other embodiments, backup module 108 may perform one or more actions to reduce the sensitivity level of the backup task before permitting the backup task to be completed. In particular, backup module 108 may encrypt all or a portion of the data involved in the backup task. In this way, backup module 108 may reduce the likelihood that an attacker is able to access sensitive data while the data is transferred to the backup server. Backup module 108 may perform any additional or alternative action to ensure that a sensitive backup task is appropriately handled, such as by requesting that all or a portion of the data involved in the backup task be handled by a backup server with a more secure signed certificate or by requesting that the designated backup server receive a more secure signed certificate.

As described above, in some examples, the systems described herein may deploy a signed certificate on a backup client that has a security level appropriate for a trust level of the backup client. In these examples, backup module 108 may facilitate a backup task for the backup client based on a determination of whether a security level of the backup client's signed certificate is appropriate for a sensitivity level of the backup task. For example, in the event that the backup client's signed certificate is not appropriate for the backup task, backup module 108 may either abort the backup task or encrypt data involved in the backup task before transferring the backup data. Furthermore, in some embodiments, backup module 108 may determine that a designated backup server will not permit a backup task to be performed in the event that a backup client's signed certificate is not appropriate for the backup task.

Figure 4:
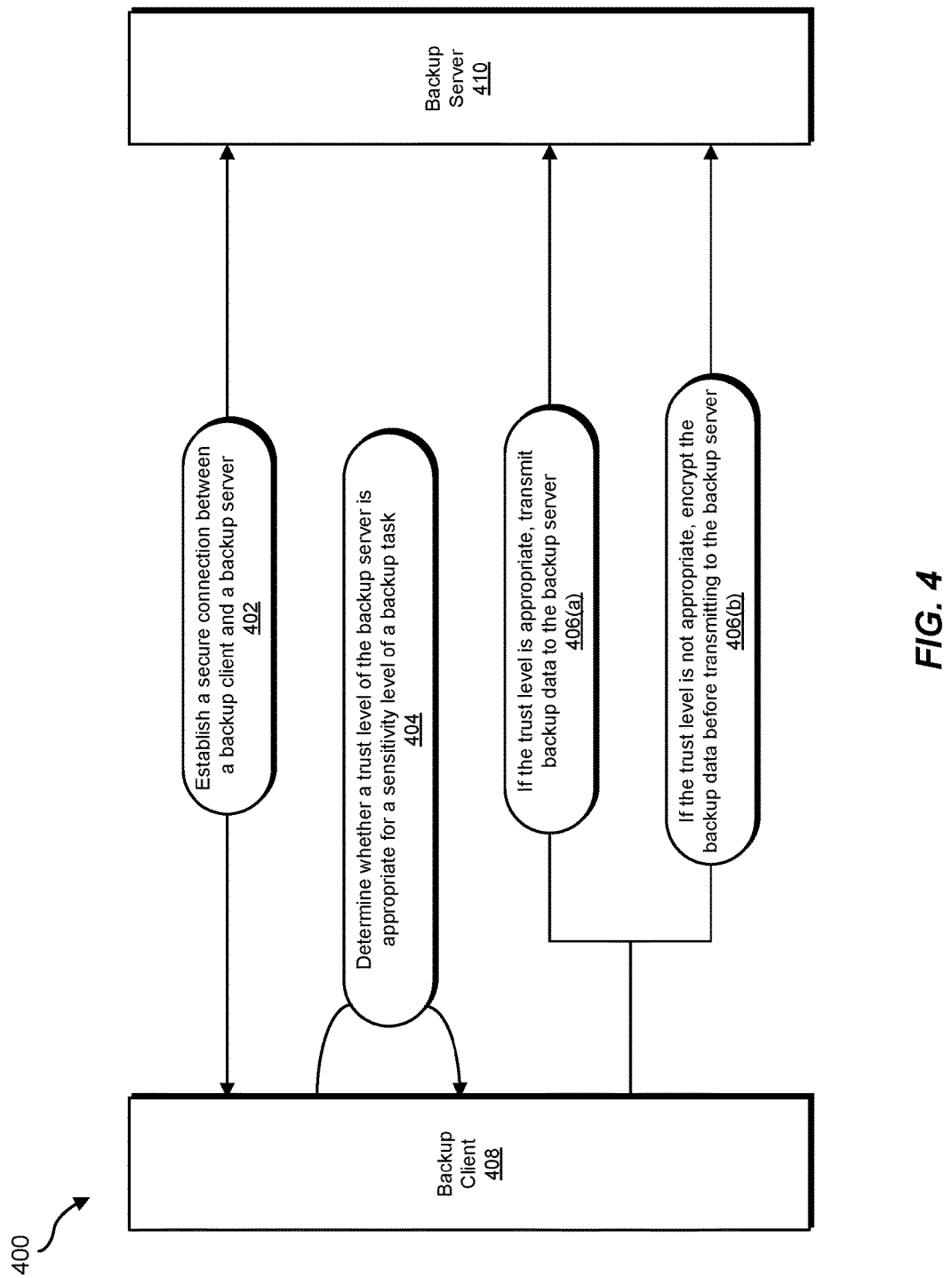
FIG. 4 is a block diagram of an additional example method for performing secure backup operations.

FIG. 4 illustrates an example method 400 of facilitating a secure backup operation. In particular, FIG. 4 illustrates steps that may be performed by a backup client 408 and a backup server 410 while backup server 410 receives data to be stored from backup client 408. As shown in FIG. 4, at step 402 a secure connection may be established between backup client 408 and backup server 410. Specifically, at step 402 backup client 408 and backup server 410 may identify and/or verify each other (e.g., based on signed certificates deployed on backup client 408 and backup server 410). Next, at step 404, backup client 408 may determine whether a trust level of backup server 410 is appropriate for a sensitivity level of the backup task that is to be performed by backup server 410. In one example, backup client 408 may identify the trust level of backup server 410 based on security information within the signed certificate deployed on backup server 410.

In the event that backup client 408 determines that the trust level of backup server 410 is appropriate for the sensitivity level of the backup task, backup client 408 may perform step 406(a), which includes transmitting the backup data involved in the backup task to backup server 410. In particular, backup client 408 may transmit unencrypted backup data to backup server 410, as backup client 408 may determine that backup server 410 is capable of securely handling unencrypted data. In the event that backup client 408 determines that the trust level of backup server 410 is not appropriate for the sensitivity level of the backup task, backup client 408 may perform step 406(a), which includes encrypting the backup data before transmitting the backup data to backup server 410.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing secure backup operations, at least a portion of the method being performed by a computing device comprising at least one processor, the method comprising:
   determining a trust level of a backup client by identifying at least one security characteristic of the backup client;
   deploying a signed certificate on the backup client that enables the backup client to facilitate backup operations with a security level that corresponds to the trust level of the backup client;
   identifying a backup server that has been designated to perform a backup task for the backup client;
   prior to facilitating the backup task on the backup client:
      identifying a type of signed certificate deployed on the designated backup server;
      determining, based on a security level with which the type of signed certificate enables the designated backup server to perform backup operations, a trust level of the designated backup server;
      identifying a sensitivity level of the backup task based at least in part on a type of data involved in the backup task; and
      determining whether the trust level of the designated backup server is appropriate for the sensitivity level of the backup task; and
   facilitating the backup task on the backup client based on at least one of:
      the determination of whether the trust level of the designated backup server is appropriate for the sensitivity level of the backup task; and
      a determination of whether the security level of the signed certificate deployed on the backup client is appropriate for the sensitivity level of the backup task.

2. The method of claim 1, further comprising selecting, prior to facilitating the backup task on the backup client, the type of signed certificate to be deployed on the backup server based on at least one security characteristic of the backup server.

3. The method of claim 1, wherein identifying the sensitivity level of the backup task further comprises identifying at least one of:
   a type of backup operation involved in the backup task;
   a desired level of confidentiality of data involved in the backup task; and
   a security characteristic of the backup client.

4. The method of claim 1, wherein:
   determining whether the trust level of the designated backup server is appropriate for the sensitivity level of the backup task comprises determining that the trust level is appropriate for the sensitivity level; and
   facilitating the backup task on the backup client comprises transferring backup data involved in the backup task to the backup server.

5. The method of claim 4, wherein the backup data transferred to the backup server is unencrypted.

6. The method of claim 1, wherein:
  determining whether the trust level of the designated backup server is appropriate for the sensitivity level of the backup task comprises determining that the trust level is not appropriate for the sensitivity level; and
  facilitating the backup task on the backup client comprises reducing the sensitivity level of the backup task prior to facilitating the backup task on the backup client.

7. The method of claim 6, wherein reducing the sensitivity level of the backup task comprises encrypting backup data involved in the backup task.

8. A system for performing secure backup operations, the system comprising:
  a backup module, stored in memory, that:
    determines a trust level of a backup client by identifying at least one security characteristic of the backup client; and
    deploys a signed certificate on the backup client that enables the backup client to facilitate backup operations with a security level that corresponds to the trust level of the backup client;
  an identification module, stored in memory, that identifies a backup server that has been designated to perform a backup task for the backup client;
  a determination module, stored in memory, that, prior to the backup task being facilitated on the backup client:
    identifies a type of signed certificate deployed on the designated backup server;
    determines, based on a security level with which the type of signed certificate enables the designated backup server to perform backup operations, a trust level of the designated backup server;
    identifies a sensitivity level of the backup task based at least in part on a type of data involved in the backup task; and
    determines whether the trust level of the designated backup server is appropriate for the sensitivity level of the backup task;
  wherein the backup module facilitates the backup task on the backup client based on at least one of:
    the determination of whether the trust level of the designated backup server is appropriate for the sensitivity level of the backup task; and
    a determination of whether the security level of the signed certificate deployed on the backup client is appropriate for the sensitivity level of the backup task; and
  at least one physical processor configured to execute the identification module, the determination module, and the backup module.

9. The system of claim 8, wherein the determination module further selects, prior to the backup task being facilitated on the backup client, the type of signed certificate to be deployed on the backup server based on at least one security characteristic of the backup server.

10. The system of claim 8, wherein the determination module determines the sensitivity level of the backup task by identifying at least one of:
  a type of backup operation involved in the backup task;
  a desired level of confidentiality of data involved in the backup task; and
  a security characteristic of the backup client.

11. The system of claim 8, wherein:
  the determination module determines whether the trust level of the designated backup server is appropriate for the sensitivity level of the backup task by determining that the trust level is appropriate for the sensitivity level; and
  the backup module facilitates the backup task on the backup client by transferring backup data involved in the backup task to the backup server.

12. The system of claim 11, wherein the backup data transferred to the backup server is unencrypted.

13. The system of claim 8, wherein:
  the determination module determines whether the trust level of the designated backup server is appropriate for the sensitivity level of the backup task by determining that the trust level is not appropriate for the sensitivity level; and
  the backup module facilitates the backup task on the backup client by reducing the sensitivity level of the backup task prior to facilitating the backup task on the backup client.

14. The system of claim 13, wherein the backup module reduces the sensitivity level of the backup task by encrypting backup data involved in the backup task.

15. A non-transitory computer-readable medium comprising one or more computer-executable instructions that, when executed by at least one processor of a computing device, cause the computing device to:
  determine a trust level of a backup client by identifying at least one security characteristic of the backup client;
  deploy a signed certificate on the backup client that enables the backup client to facilitate backup operations with a security level that corresponds to the trust level of the backup client;
  identify a backup server that has been designated to perform a backup task for the backup client;
  prior to facilitating the backup task on the backup client:
    identify a type of signed certificate deployed on the designated backup server;
    determine, based on a security level with which the type of signed certificate enables the designated backup server to perform backup operations, a trust level of the designated backup server;
    identify a sensitivity level of the backup task based at least in part on a type of data involved in the backup task; and
    determine whether the trust level of the designated backup server is appropriate for the sensitivity level of the backup task; and
  facilitate the backup task on the backup client based on at least one of:
    the determination of whether the trust level of the designated backup server is appropriate for the sensitivity level of the backup task; and
    a determination of whether the security level of the signed certificate deployed on the backup client is appropriate for the sensitivity level of the backup task.

* * * * *